United States Patent
Leonberger et al.

(10) Patent No.: US 11,435,603 B2
(45) Date of Patent: Sep. 6, 2022

(54) TFP OPTICAL TRANSITION DEVICE AND METHOD

(71) Applicant: Lightwave Logic Inc., Englewood, CO (US)

(72) Inventors: Frederick J. Leonberger, Sarasota, FL (US); Karen Liu, Montclair, NJ (US); Michael Lebby, San, CA (US)

(73) Assignee: LIGHTWAVE LOGIC INC., Englewood, CA (US)

( * ) Notice: Subject to any disclaimer, the term of this patent is extended or adjusted under 35 U.S.C. 154(b) by 81 days.

(21) Appl. No.: 17/070,749

(22) Filed: Oct. 14, 2020

(65) Prior Publication Data
US 2022/0113566 A1   Apr. 14, 2022

(51) Int. Cl.
*G02F 1/065* (2006.01)
*G02F 1/21* (2006.01)
*G02F 1/225* (2006.01)

(52) U.S. Cl.
CPC ............. *G02F 1/065* (2013.01); *G02F 1/212* (2021.01); *G02F 1/225* (2013.01)

(58) Field of Classification Search
CPC ........... G02F 1/065; G02F 1/212; G02F 1/225
See application file for complete search history.

(56) References Cited

U.S. PATENT DOCUMENTS

| | | | | | |
|---|---|---|---|---|---|
| 6,067,387 | A * | 5/2000 | Oh | ........................... | G02F 1/065 385/2 |
| 6,813,417 | B2 * | 11/2004 | Oh | ....................... | G02B 6/1221 385/141 |
| 6,895,162 | B2 * | 5/2005 | Bintz | ..................... | G02B 6/132 385/141 |
| 7,693,355 | B2 * | 4/2010 | Peyghambarian | ...... | G02F 1/065 385/129 |
| 7,912,327 | B2 * | 3/2011 | DeRose | .................. | G02F 1/065 385/129 |
| 8,582,929 | B2 * | 11/2013 | Yi | .......................... | G02F 1/2257 385/40 |

* cited by examiner

*Primary Examiner* — John Bedtelyon
(74) *Attorney, Agent, or Firm* — Parsons & Goltry; Robert A. Parsons; Michael W. Goltry

(57) ABSTRACT

A thin film polymer device including a waveguide core surrounded by dielectric material positioned on a platform. The core has a passive input portion and a passive output portion joined by a necked down active portion. A layer of EO polymer material positioned on the dielectric material overlying the active portion of the core and the core, the EO polymer, and the dielectric material all having refractive indices with the refractive index of the EO polymer being higher than the refractive index of the dielectric material. Light progressing through the core from the passive input portion to the passive output portion transitions to the layer of EO polymer material as it enters the necked down active portion and transitions back to the core as it leaves the necked down active portion.

17 Claims, 26 Drawing Sheets

TFP OPTICAL TRANSITION DEVICE AND METHOD

FIELD OF THE INVENTION

This invention relates to thin film polymer (TFP) devices and more specifically to thin film polymer devices incorporating a single layer of EO polymer.

BACKGROUND OF THE INVENTION

A polymer ridge waveguide is typically made of a lower cladding layer, an active region and an upper cladding layer. A modulator formed from this prior art waveguide has additional top and bottom electrodes for input of the modulating electrical signals. The problem is that each additional layer adds expense, labor, and opportunities for failure.

It would be highly advantageous, therefore, to remedy the foregoing and other deficiencies inherent in the prior art.

Accordingly, it is an object of the present invention to provide a new and improved thin film polymer optical transition device incorporating a single layer of EO polymer.

It is another object of the present invention to provide a new and improved thin film polymer modulator that is easier to fabricate.

It is another object of the present invention to provide a new and improved thin film polymer modulator and method of fabrication.

It is another object of the present invention to provide a new and improved thin film polymer modulator using standard fabrication processes.

SUMMARY OF THE INVENTION

To achieve the desired objects and advantages of the present invention a thin film polymer device includes at least one waveguide core surrounded by dielectric material positioned on a platform. The waveguide core has a passive input portion and a passive output portion joined by a necked down active portion. A layer of EO polymer material is positioned on a surface of the dielectric material overlying the necked down active portion of the waveguide core. The waveguide core, the EO polymer, and the dielectric material all have refractive indices with the refractive index of the waveguide core generally being higher than the refractive index of the EO polymer (In some applications the EO polymer could be the same or higher than the refractive index of the waveguide core) and the refractive index of the EO polymer being higher than the refractive index of the dielectric material. At least some of the light progressing through the waveguide core from the passive input portion to the passive output portion transitions to the layer of EO polymer material as it enters the necked down active portion and transitions back to the waveguide core as it leaves the necked down active portion.

To further achieve the desired objects and advantages of the present invention a specific embodiment of a thin film polymer device includes a silicon substrate defining a platform. A pair of similar waveguide cores spaced apart in a plane and extending parallel to each other, the pair of waveguide cores surrounded by dielectric material positioned on the platform, each of pair of waveguide cores having a passive input portion and a passive output portion joined by a necked down active portion. A layer of EO polymer material is positioned on a surface of the dielectric material overlying the necked down active portion of the waveguide core and electrodes are positioned adjacent to the layer of EO polymer material and in a spaced relationship to the pair of waveguide cores. The waveguide core, the EO polymer, and the dielectric material all having refractive indices with the refractive index of the waveguide core generally being higher than the refractive index of the EO polymer (In some applications the EO polymer could be the same or higher than the refractive index of the waveguide core) and the refractive index of the EO polymer being higher than the refractive index of the dielectric material. The pair of similar waveguide cores, the layer of EO polymer material, and the electrodes are positioned to form a Mach-Zehnder modulator in which at least some of the light progressing through the waveguide core from the passive input portion to the passive output portion transitions to the layer of EO polymer material as it enters the necked down active portion and transitions back to the waveguide core as it leaves the necked down active portion.

To further achieve the desired objects and advantages of the present invention a specific method of fabricating a thin film polymer device include the steps of fabricating a single polymer layer device assembly including providing a silicon base having an oxidized surface, depositing a metallization layer on the oxidized surface and patterning the metallization layer to define electrodes for operating the thin film polymer device, depositing a bottom clad layer on the electrodes forming a planar surface, depositing a blocking layer on the planar surface of the bottom clad layer, and depositing a layer of EO polymer material on the blocking layer. The method of fabricating the thin film polymer device further includes the steps of fabricating a waveguide layout including a pair of similar waveguide cores spaced apart in a plane and extending parallel to each other, the pair of waveguide cores surrounded by dielectric material positioned on a platform, each of the pair of waveguide cores having a passive input portion and a passive output portion joined by a necked down active portion, and affixing a surface of the EO polymer material to a surface of the dielectric material on the platform with the electrodes positioned relative to the necked down active portions of the pair of similar waveguide cores to form a Mach-Zehnder modulator.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1A:
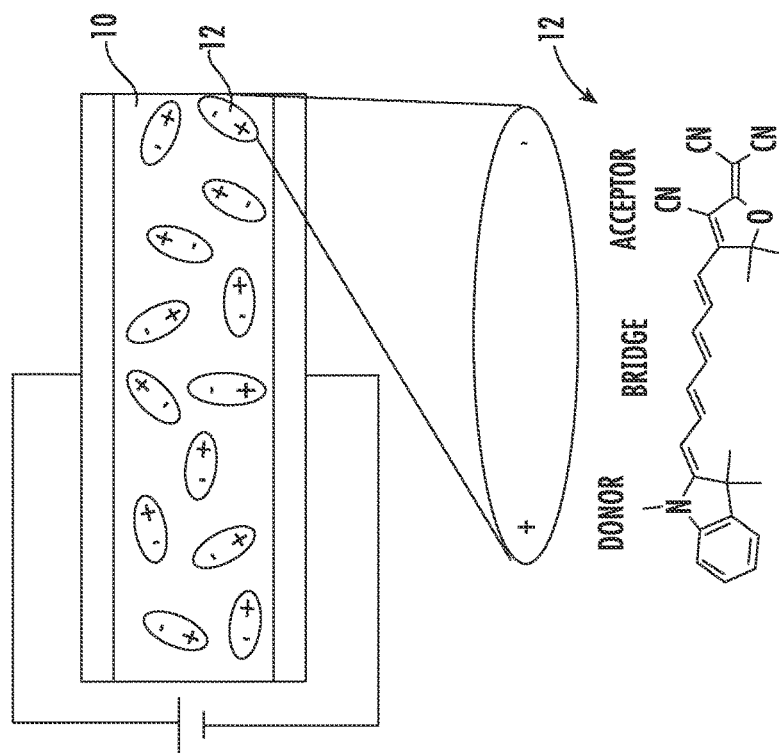
FIG. 1A illustrates an EO polymer with un-poled (un-aligned) chromophore molecules.
Figure 1B:
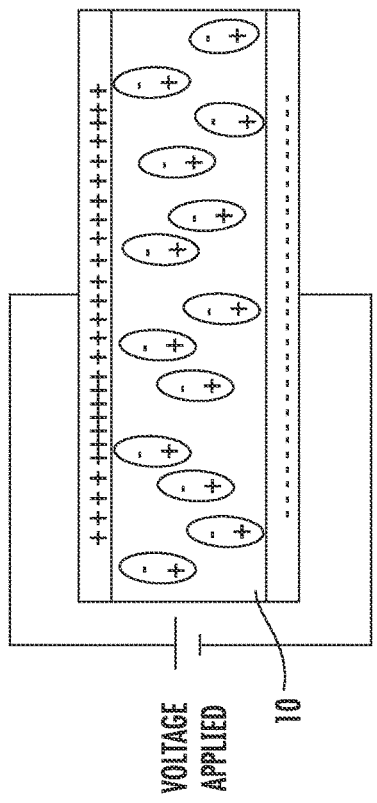
FIG. 1B illustrates the EO polymer with poled (aligned) chromophore molecules.

Referring to FIGS. 1A and 1B, an electro-optic polymer layer 10 is illustrated having permanent dipole chromophore molecules 12 (illustrated in an enlarged portion of FIG. 1A) which are un-poled or unaligned in FIG. 1A. In FIG. 1B a voltage is applied across layer 10 that poles or aligns permanent dipole chromophore molecules 12 so that layer 10 can be used as a light conductor in thin film polymer (TFP) devices. Electro-optic polymer layer 10 has an electro-optic coefficient ($r_{33}$) ideally approximately 200 pm/V with excellent stability at 85° C. Specifically, in the present invention electro-optic polymer layer 10 with an input signal of 1310 nm, $r_{33}$ is >200 pm/V and with an input signal of 1550 nm, $r_{33}$ is >165 pm/V. The improved performance of the EO chromophore $r_{33}$ results in lower power needed for operation of the thin film polymer (TFP) devices.

Figure 2:
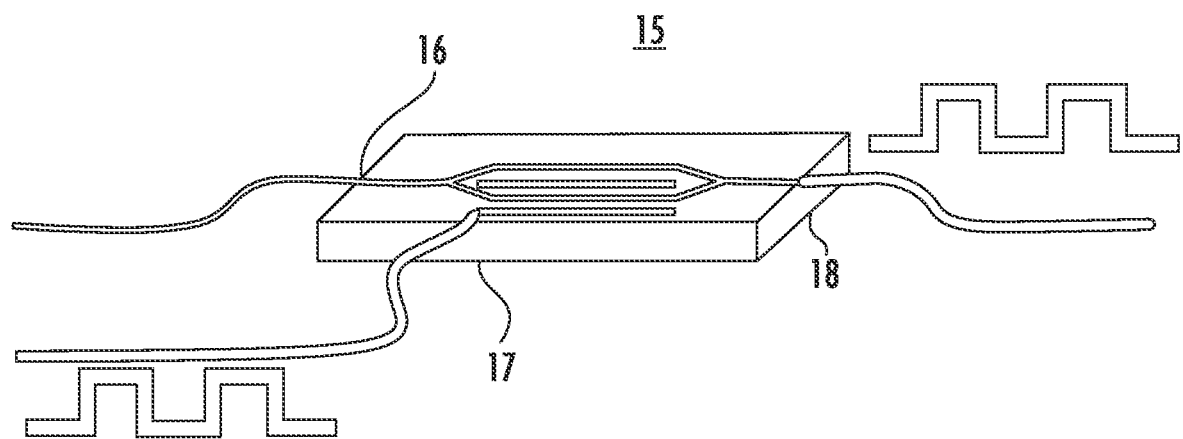
FIG. 2 is a view of a simplified Mach-Zehnder modulator illustrating input signals and output signals.

Turning to FIG. 2, a typical Mach-Zehnder modulator 15 is illustrated. Modulator 15 includes a light input terminal 16, which might be received from an optical fiber or, if integrated on a common platform with a laser, will come directly from the integrated laser. An electrical signal input 17 applies a voltage across at least one leg of Mach-Zehnder modulator 15 to alter the relative phases and/or intensities in the two legs and produce a modulated output light at an output terminal 18 in a well-known manner. As explained briefly above, waveguide forming the legs of Mach-Zehnder modulator 15 are typically made of a lower cladding layer, an active region and an upper cladding layer with poling of the active region being vertical.

Figure 3:
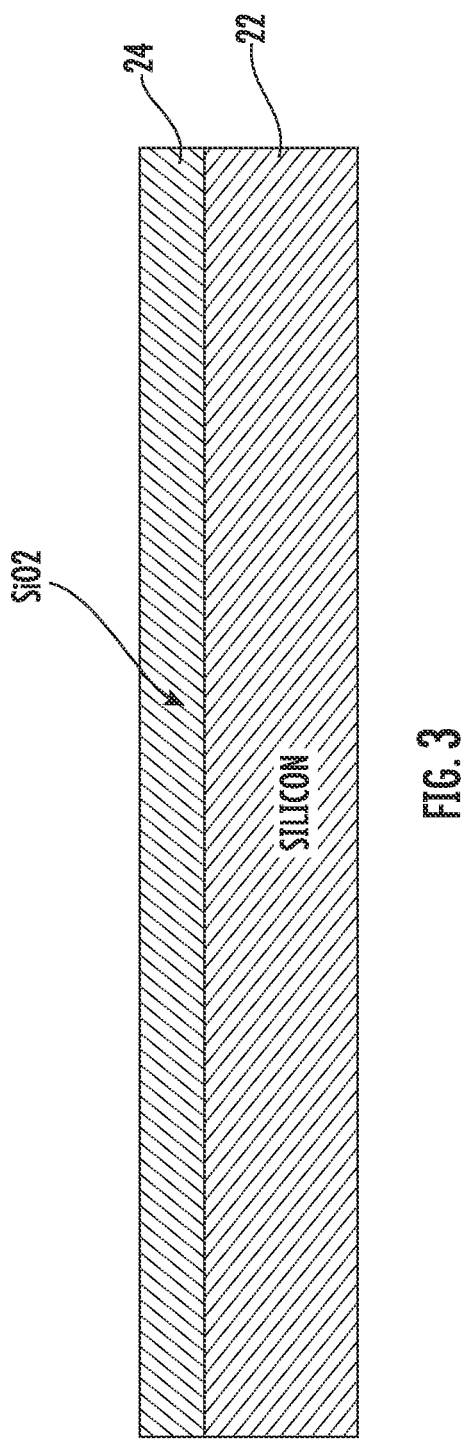
FIG. 3 illustrates several initial steps in the fabrication of the single polymer layer device assembly.
Figure 4:
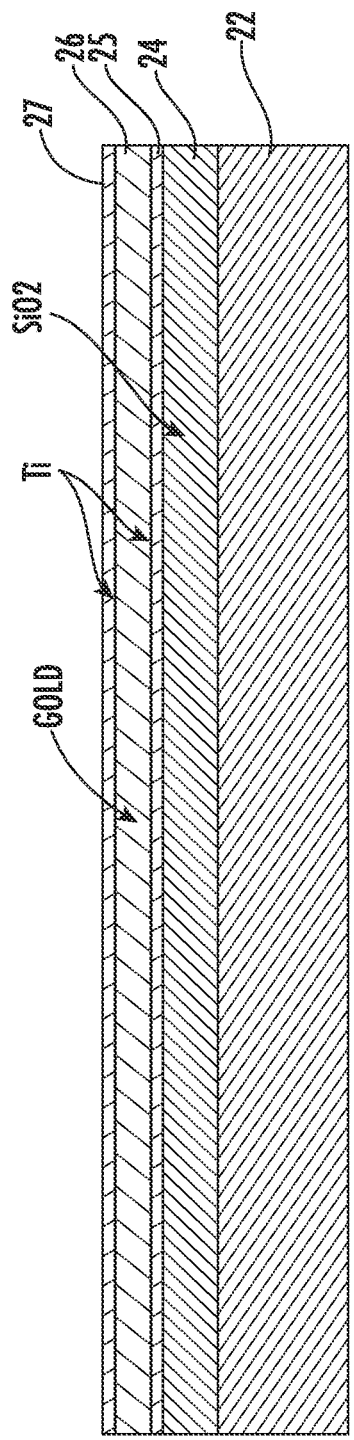
FIGS. 4 through 10 illustrates additional steps in the fabrication of the single polymer layer device assembly.

Turning to FIGS. 3 through 10 steps in the fabrication of a single polymer layer device assembly 20 in accordance with the present invention are illustrated. Referring specifically to FIG. 3, a silicon platform or substrate 22 is provided. In a preferred embodiment, silicon platform 22 is an intrinsic undoped fused zone silicon wafer with a resistivity higher than 10 K ohms. The surface of silicon platform 22 is preferably thermally oxidized to form an $SiO_2$ layer 24 with a 1000 nm thickness but could be some other dielectric material. Referring specifically to FIG. 4, a sputtering deposition of a 7.5 nm titanium layer 25 is applied to the surface of $SiO_2$ layer 24 as an adhesion layer. Sputtering deposition of a 500 nm gold layer 26 is applied to titanium layer 25 and a sputtering deposition of a 7.5 nm titanium layer 27 is applied to the surface of gold layer 26 as an adhesion layer.

Figure 5:
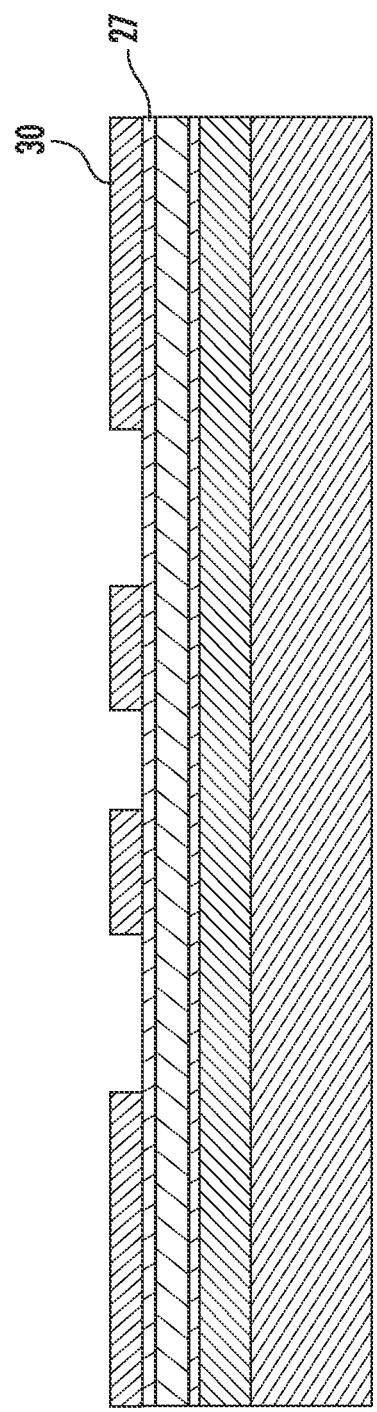
Figure 6:
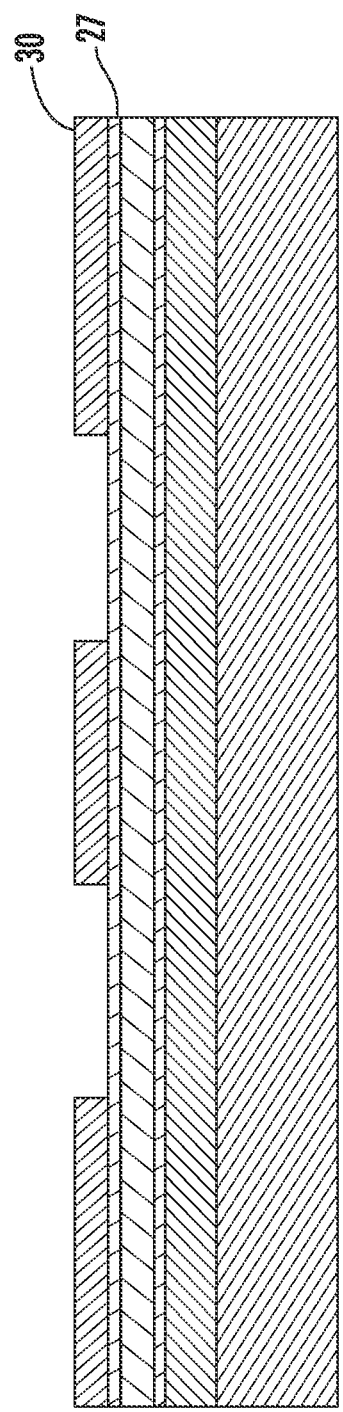
Figure 7:
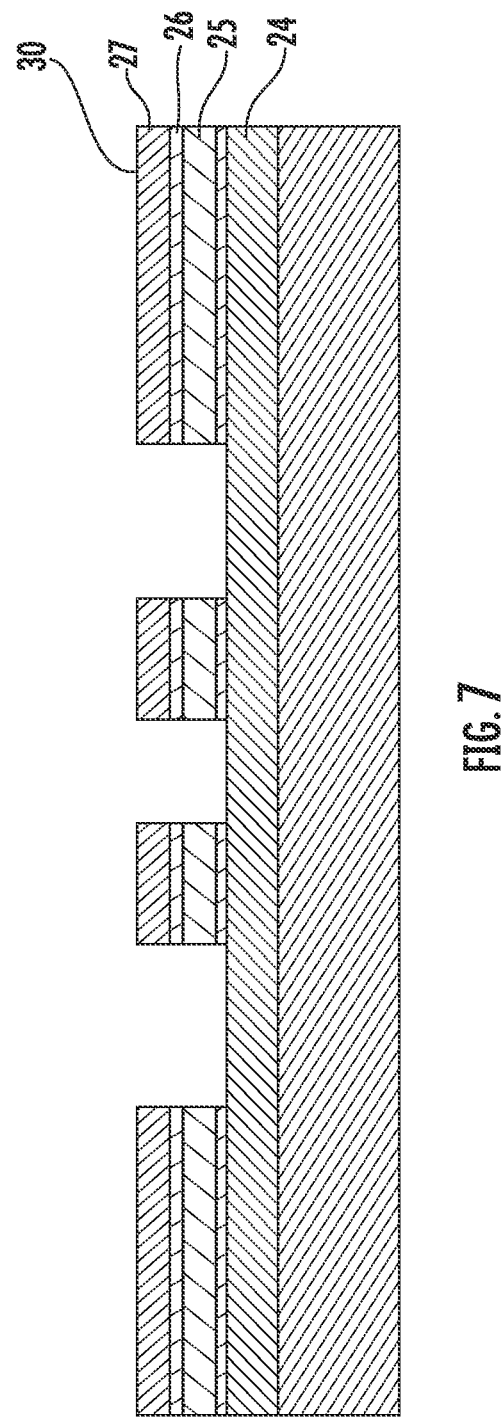
Figure 8:
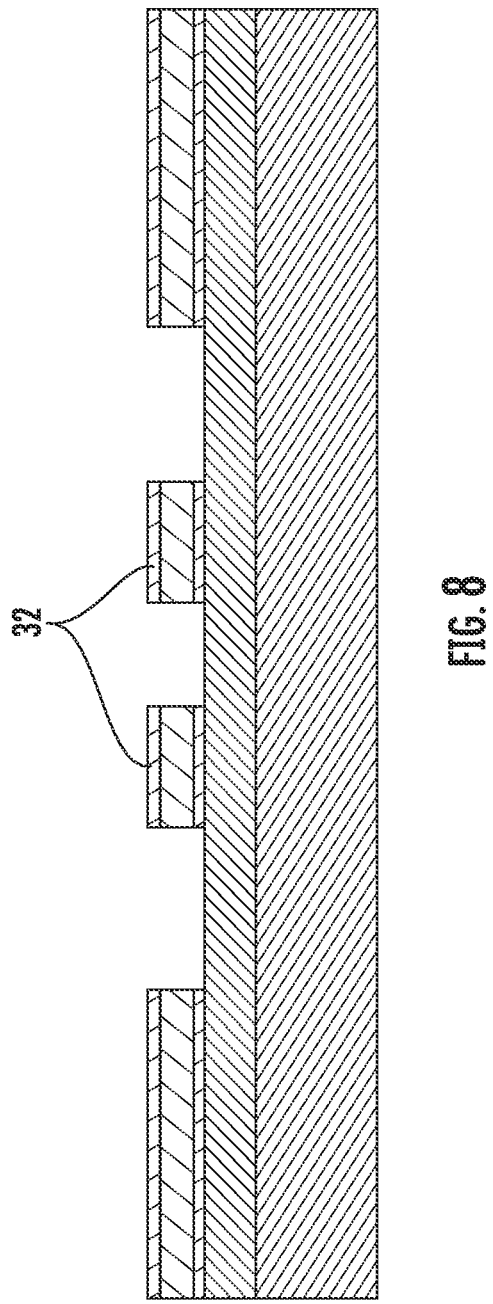

Referring specifically to FIGS. 5 and 6, a photo resist layer 30 is applied to the surface of titanium layer 27 by spin coating, exposed to UV light through a photo mask (not shown) to form a photo resist pattern defining various electrodes and other electrical connections. Referring specifically to FIG. 7, the photo resist pattern 30 is used in an etching process with titanium layer 27 removed in the pattern by wet etching, gold layer 26 removed in the pattern by wet etching, and titanium layer 25 removed in the pattern by wet etching. The photo resist pattern is removed by stripping to retain electrodes 32 as illustrated in FIG. 8.

Figure 9:
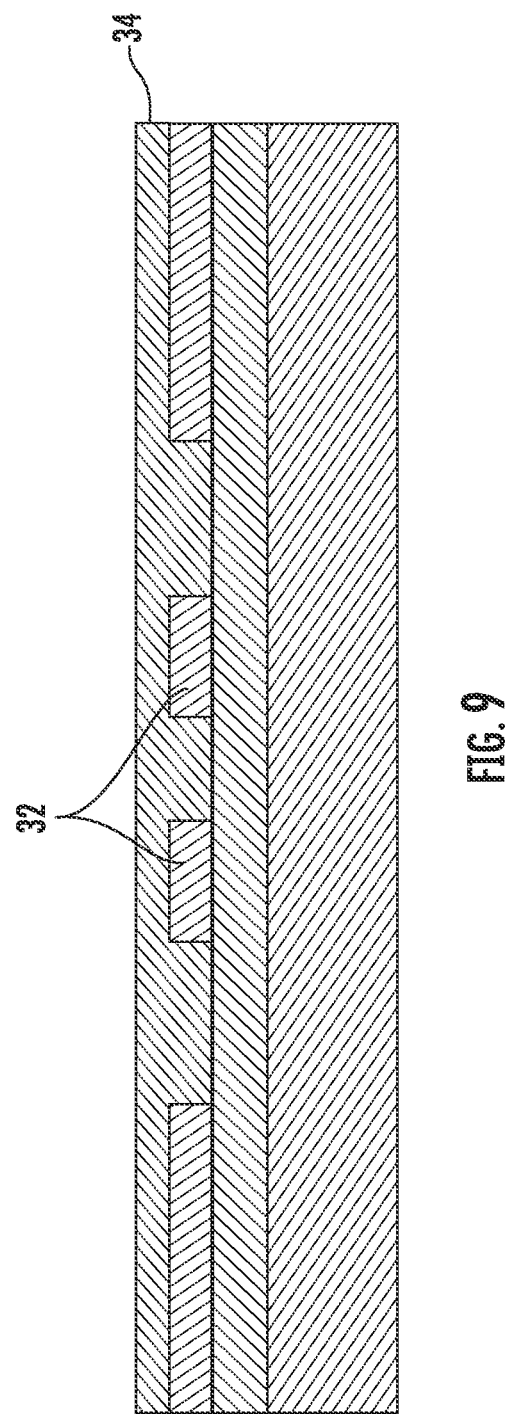
Figure 10:
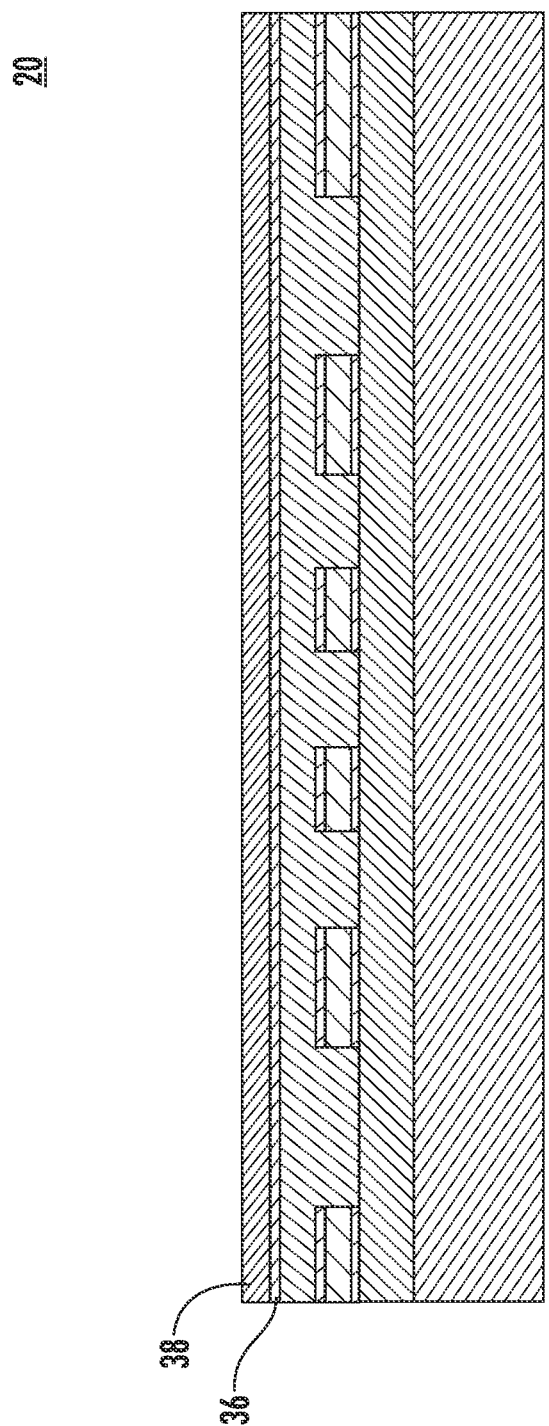

Referring specifically to FIG. 9, a bottom clad layer 34, which could be a material such as UV15 from Masterbond®, is deposited by spin coating over electrodes 32 and the exposed portions of $SiO_2$ layer 24 to planarize the structure. As illustrated in FIG. 10, an optional blocking layer 36 is deposited on the surface of cladding layer 34 and an EO polymer core layer 38 is deposited by spin coating on the surface of optional blocking layer 36. The structure is then soft baked and hard baked to cure the various layers of material and complete the single polymer layer device assembly 20. In the preferred embodiment, $SiO_2$ layer 24 is 10 μm thick with a range of 1-20 μm, electrodes 22 are 1 um thick with a range of 0.5-50 μm, cladding layer 34 (above electrodes 22) is 2 μm thick with a range of 0.5-20 μm, optional blocking layer 36 is 30 nm thick with a range of 2-100 nm, and EO polymer core layer 38 is 1 μm thick with a range of 0.1-5 μm.

Figure 11:
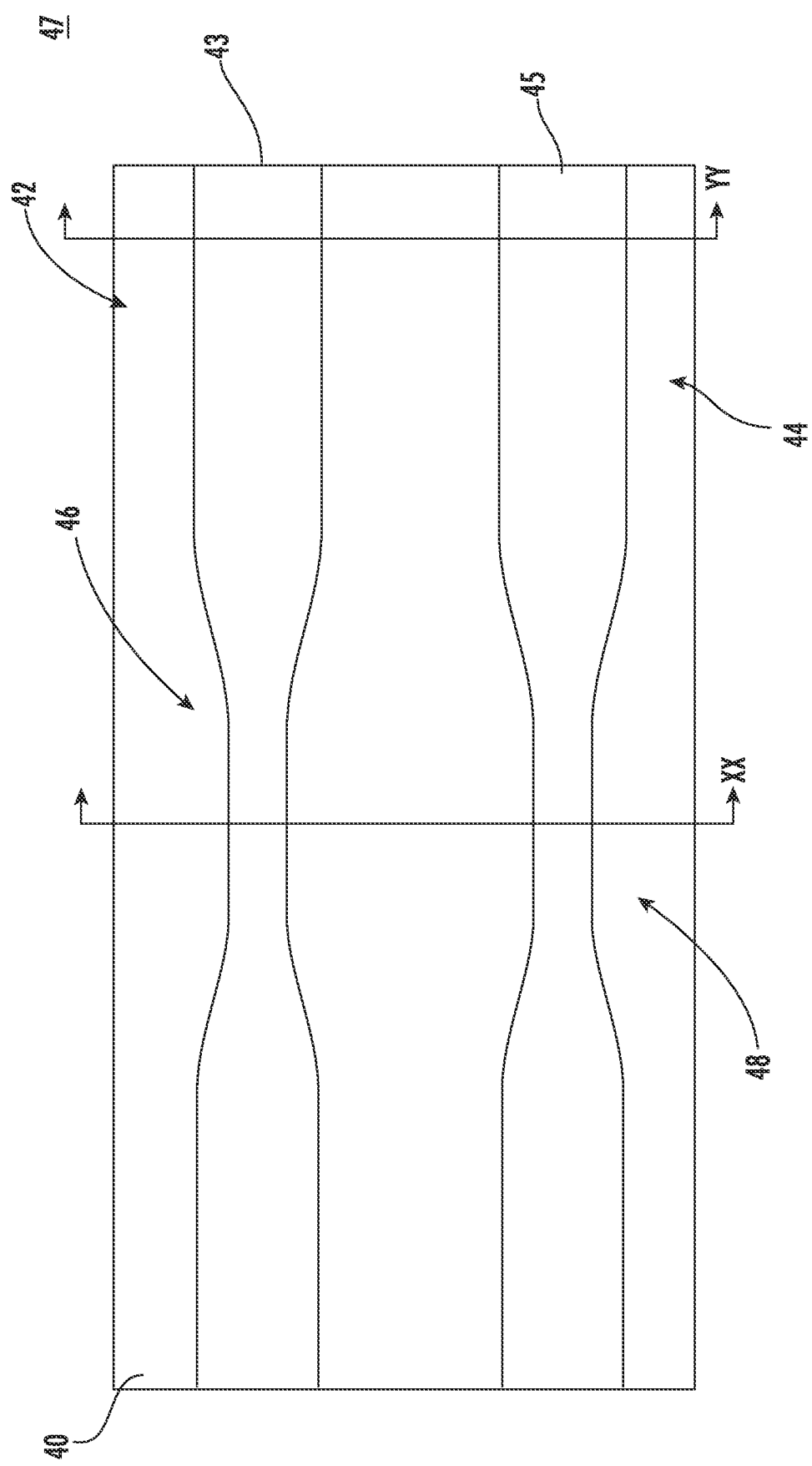
FIG. 11 is a top plan view of a waveguide layout in an integrated photonics platform in accordance with the present invention.

An integrated photonics platform 40 is fabricated, only a portion of which is illustrated in FIG. 11. Photonics platform 40 includes integrated lasers and any photonics devices required to complete desired circuitry. For purposes of the integration, photonics platform 40 may be formed on a silicon substrate but GaAs, GaN/sapphire, GaSb, InP are also options that can be used. Two spaced apart parallel waveguides 42 and 44 are formed on a surface of photonics platform 40. The cores (hereinafter 43 and 45) of waveguides 42 and 44 are relatively high refractive index silicon surrounded by lower refractive index dielectric material 41, such as SiN, $SiO_x$, etc. For purposes of understanding and selection, the refractive indices of various materials is as follows; silicon 3.5; $SiO_2$ 1.45; $Si_3N_4$ 2.0; SiON 1.45-2.0 (linear in % SN); EO polymer 1.8 (range 1.4-2.0).

It will be understood that while the cores 43 and 45 of the waveguides are illustrated as having rectangular cross-sections, any other cross-section of the variety of possible cross-sections (e.g. trapezoidal, oval, triangular, T-shaped or ridge waveguide, etc., not shown) could be utilized. It should be noted, however, that with the T-shaped (actually, it is an inverted T-shape) or ridge waveguide the main mode of light is conveyed in the top or thinner portion while slab modes are conveyed in the lower part. The T-shaped or ridge waveguide is basically a combination of the traditional rectangular waveguide with a larger slab at the bottom. Thus, the T-shaped or ridge waveguide is essentially composed of 2 layers, a lower slab layer with infinite width and an upper layer of restricted width. Also, in the following discussion, when a cross-sectional dimension is mentioned it will mean the average cross-sectional dimension of whatever type of waveguide is used, except for a T-shaped or ridge waveguide in which it will mean the cross-sectional width of the upper layer.

Figure 12:
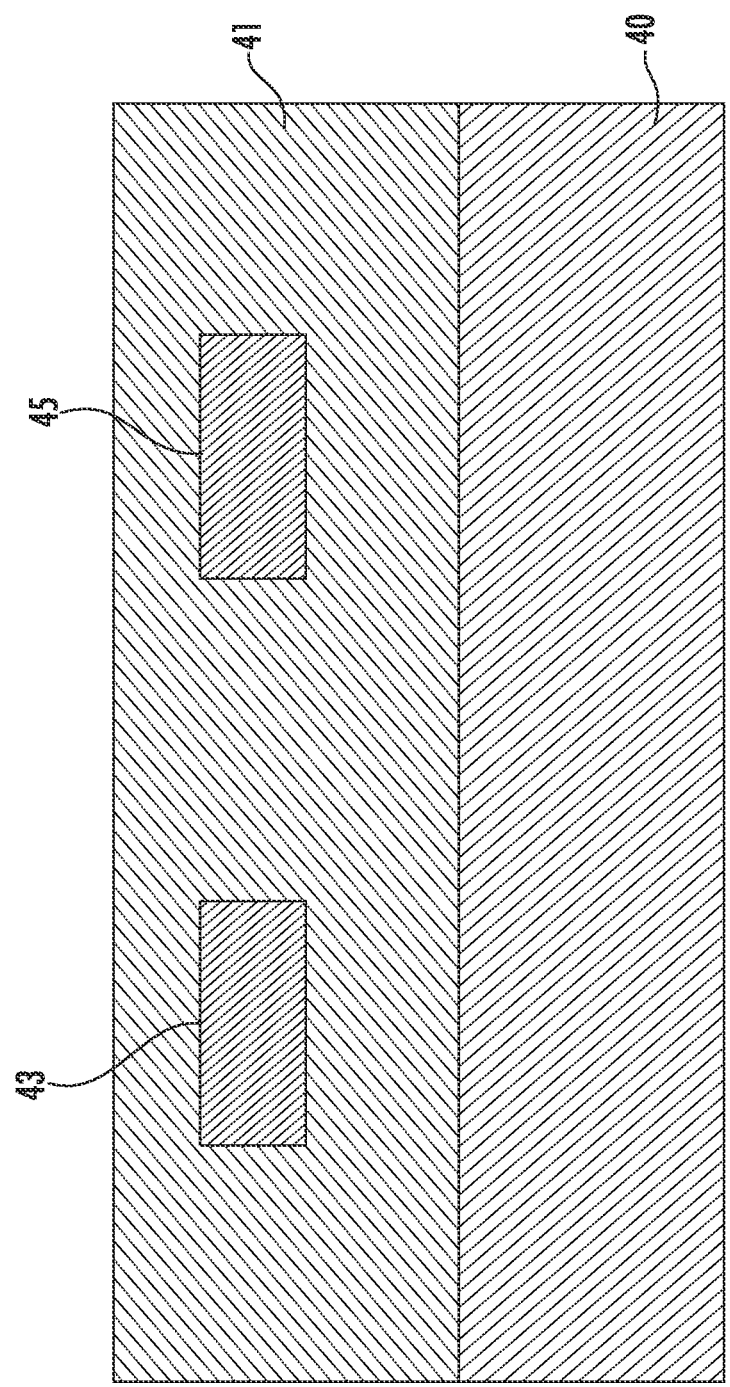
FIG. 12 is a cross-sectional view of the waveguides of FIG. 11 as seen from the line XX in FIG. 11.
Figure 13:
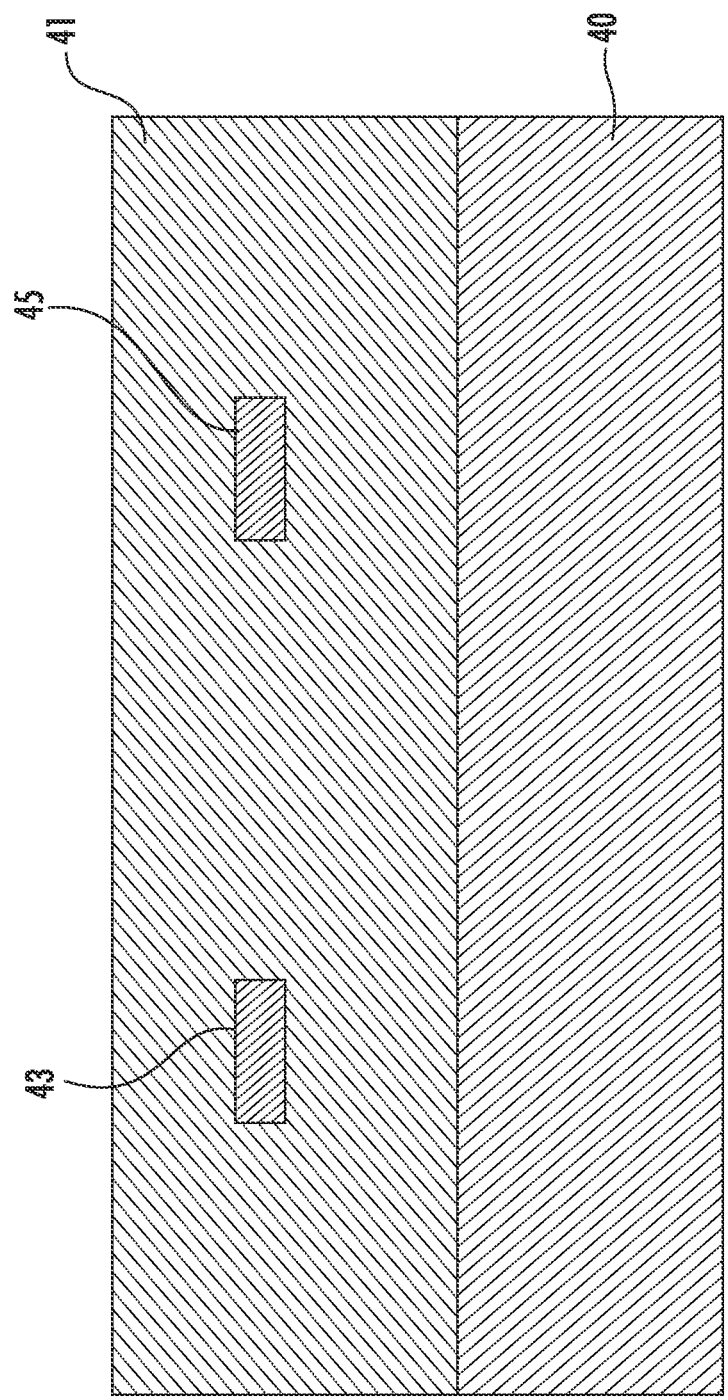
FIG. 13 is a cross-sectional view of the waveguides of FIG. 11 as seen from the line YY in FIG. 11.

Both cores 43 and 45 have a passive portion on the left-hand side defining light inputs and a passive portion on the right-hand side defining light outputs. The passive portions of cores 43 and 45 have a standard or unaltered cross-section as illustrated in the cross-sectional view of FIG. 12, seen from the line YY in FIG. 11. As can be seen by referring to FIGS. 11 and 13, both waveguide cores 43 and 45 have a necked-down or narrowed 3D dimension in active areas, designated 46 and 48, respectively, a cross-section of which can be seen in FIG. 13 from the line XX in FIG. 11. Here it should be understood that the term "necked-down" includes reduction in width only, reduction in thickness only, or reduction in width and thickness. Cores 43 and 45 gradually reduce in size from the input passive portions to the necked-down or narrowed 3D dimension in active areas 46 and 48, respectively, and then gradually increase in size to the output passive portions. It is believed that if the Si core is buried deeper in dielectric material 41 core widths can be wider. The vertical widths of the passive and active areas will remain in a fixed ratio. Thus, a waveguide layout, generally designated 47, is formed in an integrated photonics platform. When selecting a waveguide cross-section, the choice should be made to optimize the mode confinement, low loss, ease of fabrication (yield), and compatibility with more complex circuits/active devices. These factors primarily involve the waveguide core and cladding.

Generally, the widths (lateral or horizontal) of cores 43 and 45 in the passive regions is in a range of 0.1-10 μm, with optimum widths in a range of 4-8 μm. The vertical height is determined by standard waveguide engineering and is in a fixed ratio with the width. The narrowed 3D dimension active areas 46 and 48 for an optimum width are in a 2:1 to 5:1 range (passive width to active width) and the concept will work in the 2:1 to 10:1 range. As a specific example, a 4-8 μm passive region width would be reduced in the active region by much greater than 1 μm, so that for cores with a passive region width of 2 um or greater the active region width should be reduced greater than 1 um.

Figure 14:
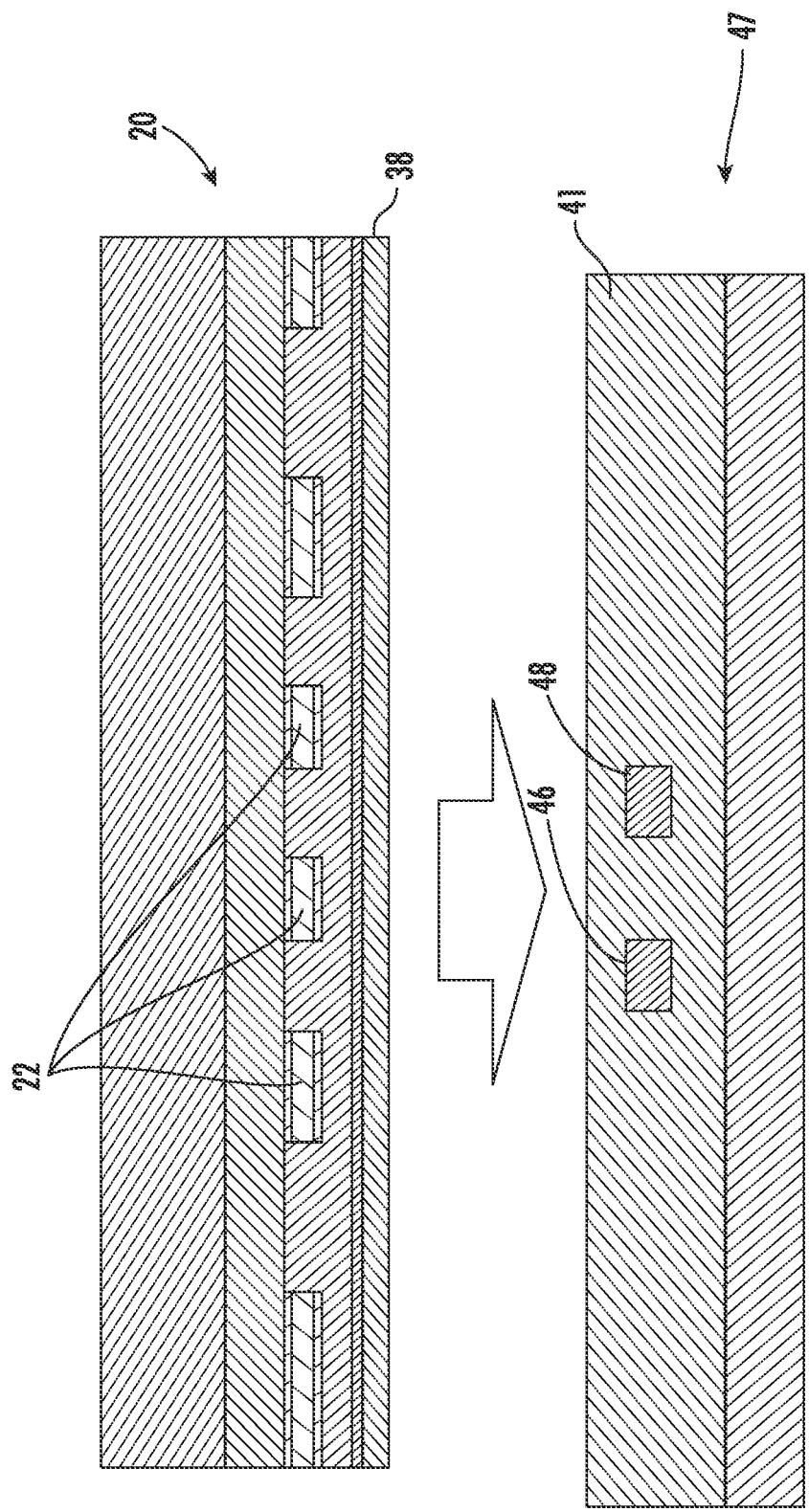
FIGS. 14 and 15 illustrate steps in combining the single polymer layer device assembly of FIG. 10 with the waveguide layout in the integrated photonics platform of FIG. 11 in accordance with the present invention.
Figure 15:
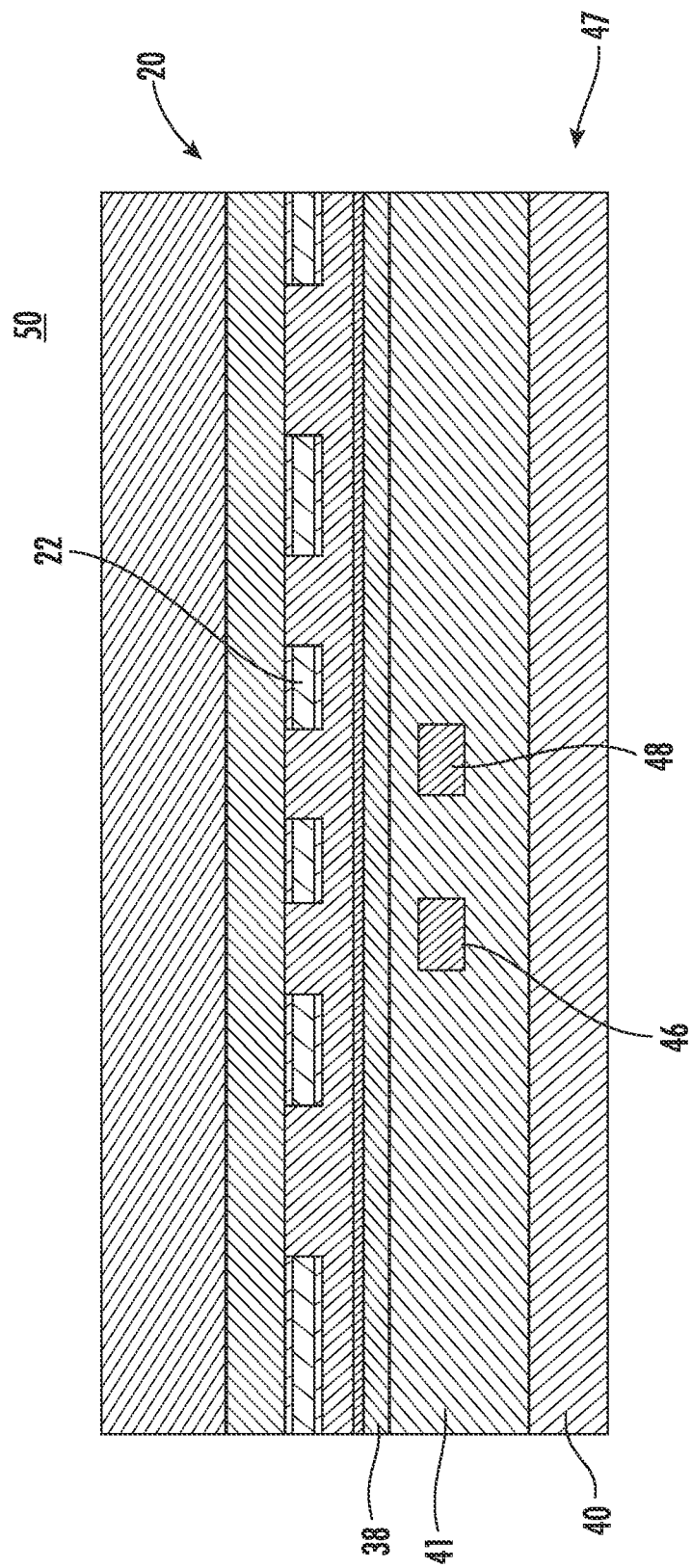

Turning to FIGS. 14 and 15 some next steps in the fabrication of a single polymer layer device assembly in accordance with the present invention, are illustrated. In a first step illustrated in FIG. 14, single polymer layer device assembly 20 is inverted so that electrodes 22 are above and to each side of narrowed 3D portions 46 and 48 of waveguides 42 and 44. The surface of EO polymer core layer 38 of single polymer layer device assembly 20 can then be bonded to the upper surface of dielectric material 41 of waveguide layout structure 47 using standard flip-chip bonding techniques.

Figure 16:
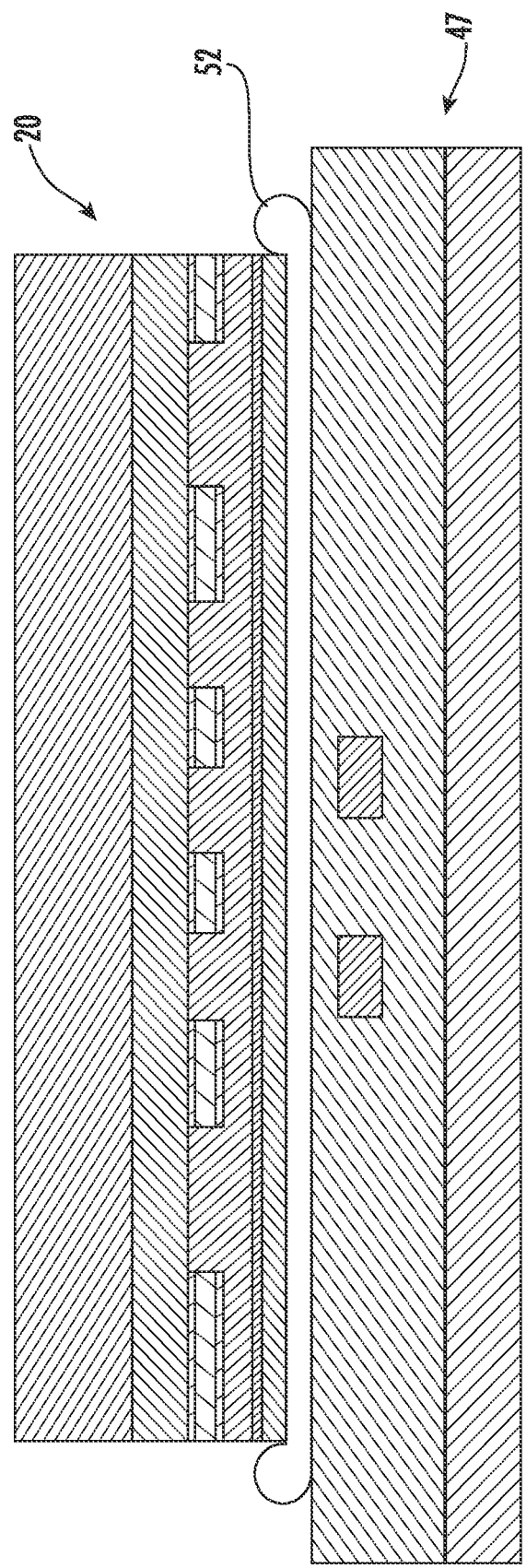
FIG. 16 illustrate another combination of the single polymer layer device assembly of FIG. 10 with the waveguide layout in the integrated photonics platform of FIG. 11 in accordance with the present invention.
Figure 17:
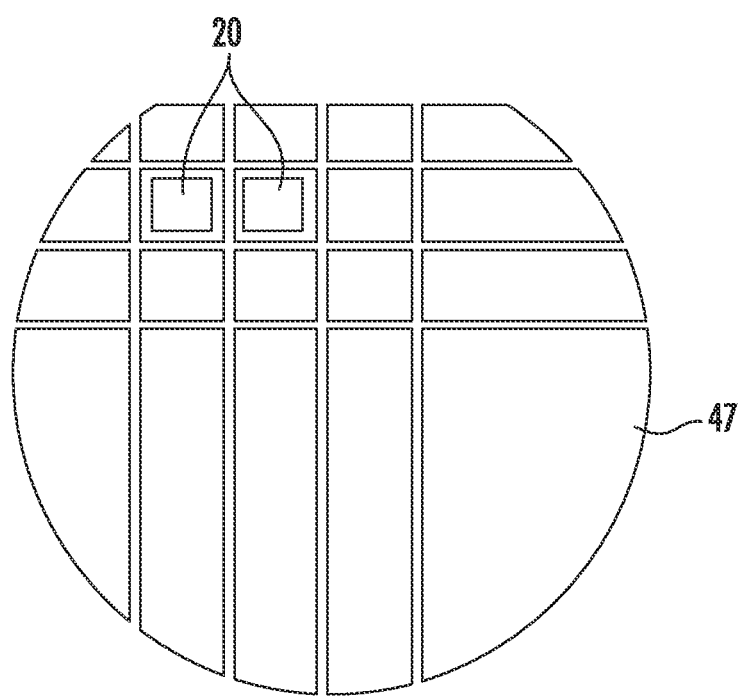
FIG. 17 is a top plan view of multiple single polymer layer device assemblies of FIG. 10 combined with waveguide layouts in a platform wafer in accordance with the present invention.

As an alternative assembly process to the flip-chip bonding technique described above, single polymer layer device assembly 20 can be glued to the upper surface of dielectric material 41 of waveguide layout structure 47 using an optically transparent glue, designated 52 in FIG. 16. Such a process allows an option for refractive index matching. As illustrated in FIG. 17, a plurality of single polymer layer device assemblies 20 can be bonded/glued to a platform wafer.

Figure 18:
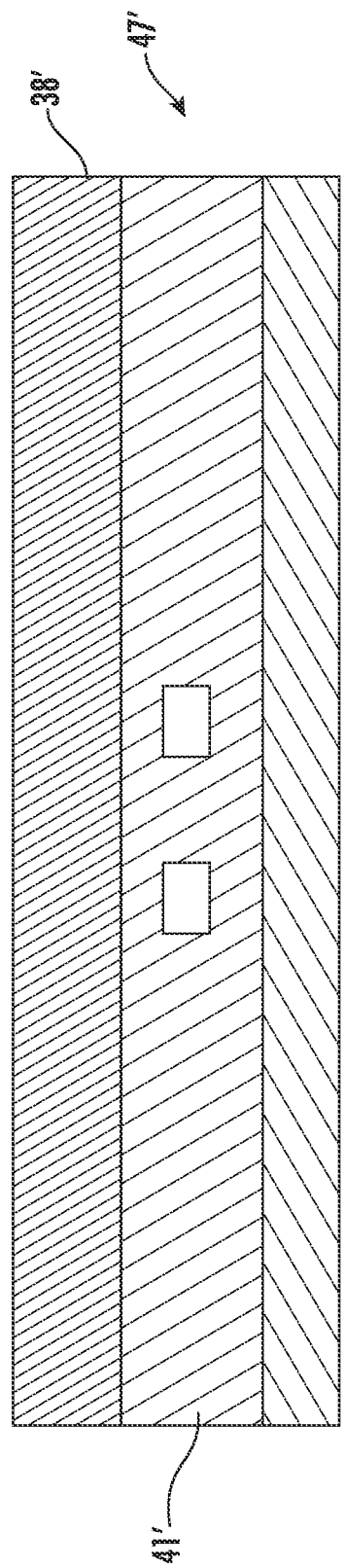
FIGS. 18, 19, and 20 illustrate steps in the fabrication of another example of a single polymer layer device assembly in accordance with the present invention.
Figure 19:
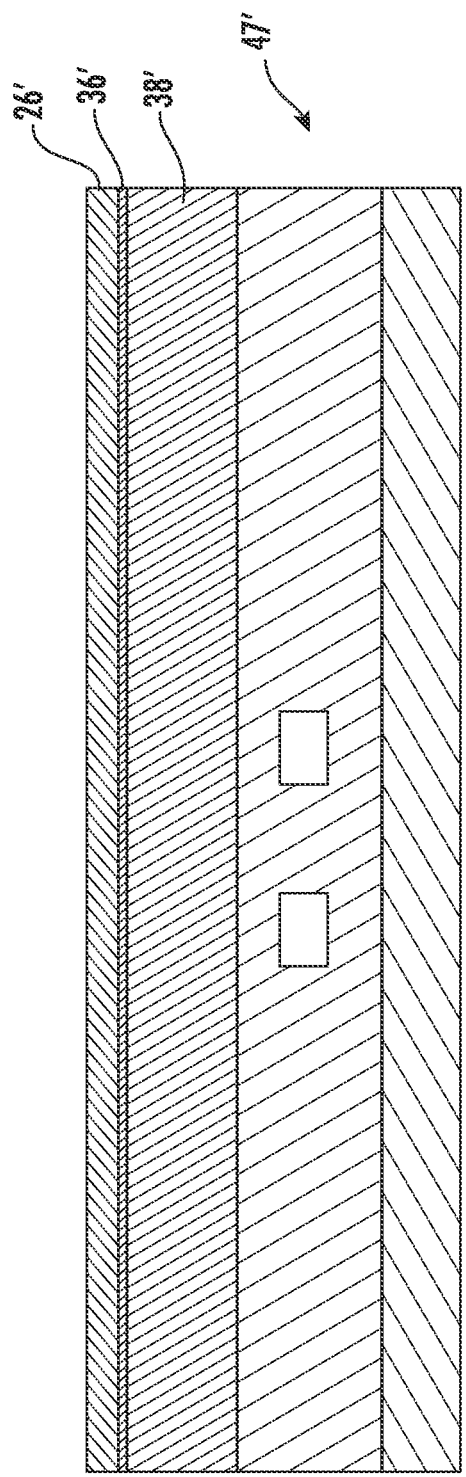
Figure 20:
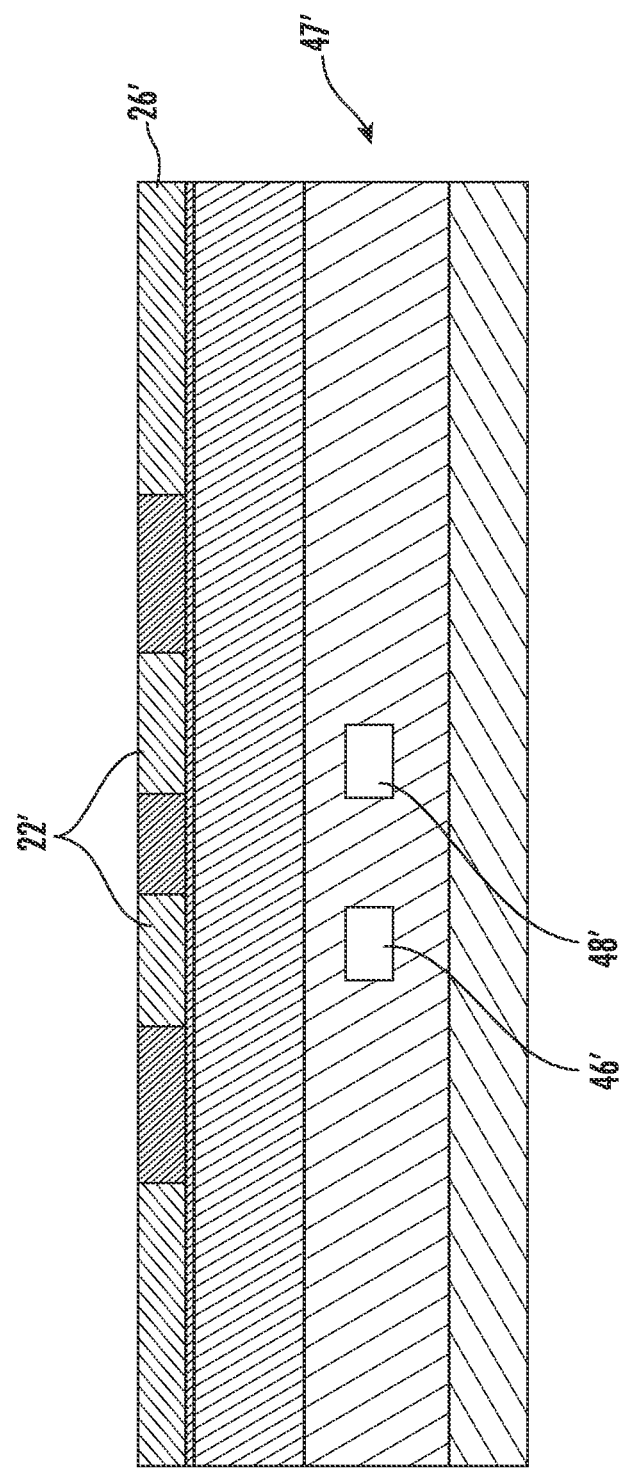

Turning to FIGS. 18, 19, and 20 several steps in the fabrication of another example of a single polymer layer device assembly 50' in accordance with the present invention are illustrated. This process begins with the provision of a waveguide layout 47', similar to waveguide layout 47 in FIG. 11. Referring specifically to FIG. 18, a spin-on layer 38' of EO polymer is deposited on the surface of dielectric material 41' of waveguide layout structure 47'. Referring additionally to FIG. 19, an optional transparent blocking layer 36', which could be oxide or dielectric based, is deposited on the surface of EO polymer layer 38' and a metallization layer 26' is deposited on the surface of transparent blocking layer 36'. It should be noted that metallization layer 26' could be similar, and similarly deposited, to the metallization illustrated and described above with relation to FIG. 4. Referring additionally to FIG. 20, metallization layer 26' is patterned to form electrodes 22' above narrowed 3D portions 46' and 48' of waveguide layout structure 47'. Thus, a single polymer layer device assembly 50' is fabricated by an alternative process in accordance with the present invention.

Figure 21:
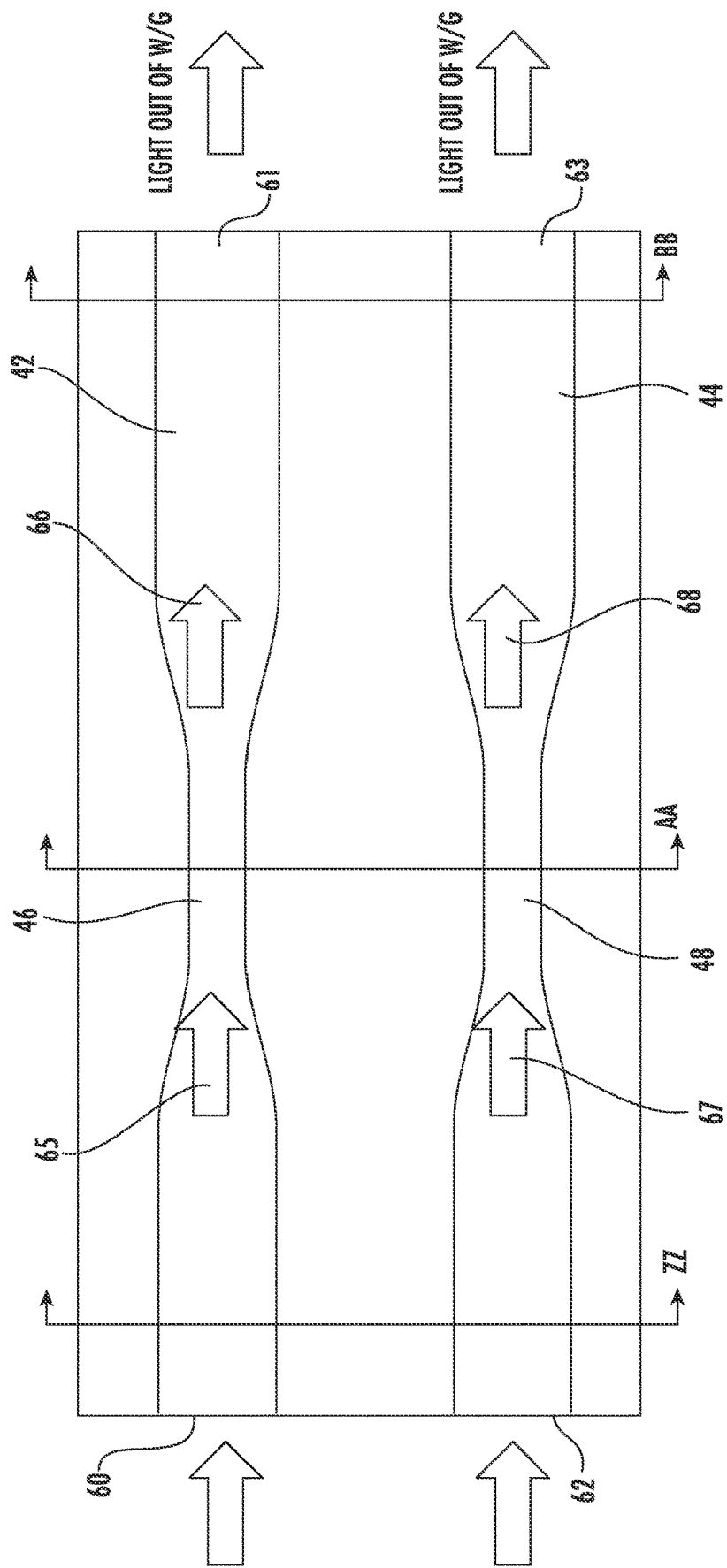
FIG. 21 is a top view illustrating the progression of light through the two legs of a Mach-Zehnder modulator formed by the integration of a single polymer layer device assembly with a waveguide layout in an integrated photonics platform in accordance with the present invention.

For purposes of describing the optical transition from input to output of single polymer layer device assembly 50 or 50', FIGS. 21 through 25 illustrate unobstructed portions of single polymer layer device assembly 50 or 50'. Referring specifically to FIG. 21, an unobstructed top view of waveguide layout structure 47/47' portion of photonics platform 40 is illustrated to better understand the light progression therethrough. Waveguide 42 has a light input 60 at the left-hand edge and a light output 61 at the right-hand edge. Similarly, waveguide 44 has a light input 62 at the left-hand edge and a light output 63 at the right-hand edge. Arrows 65, 66, and 67, 68 represent light progressing through waveguides 42 and 44, respectively.

Figure 22:
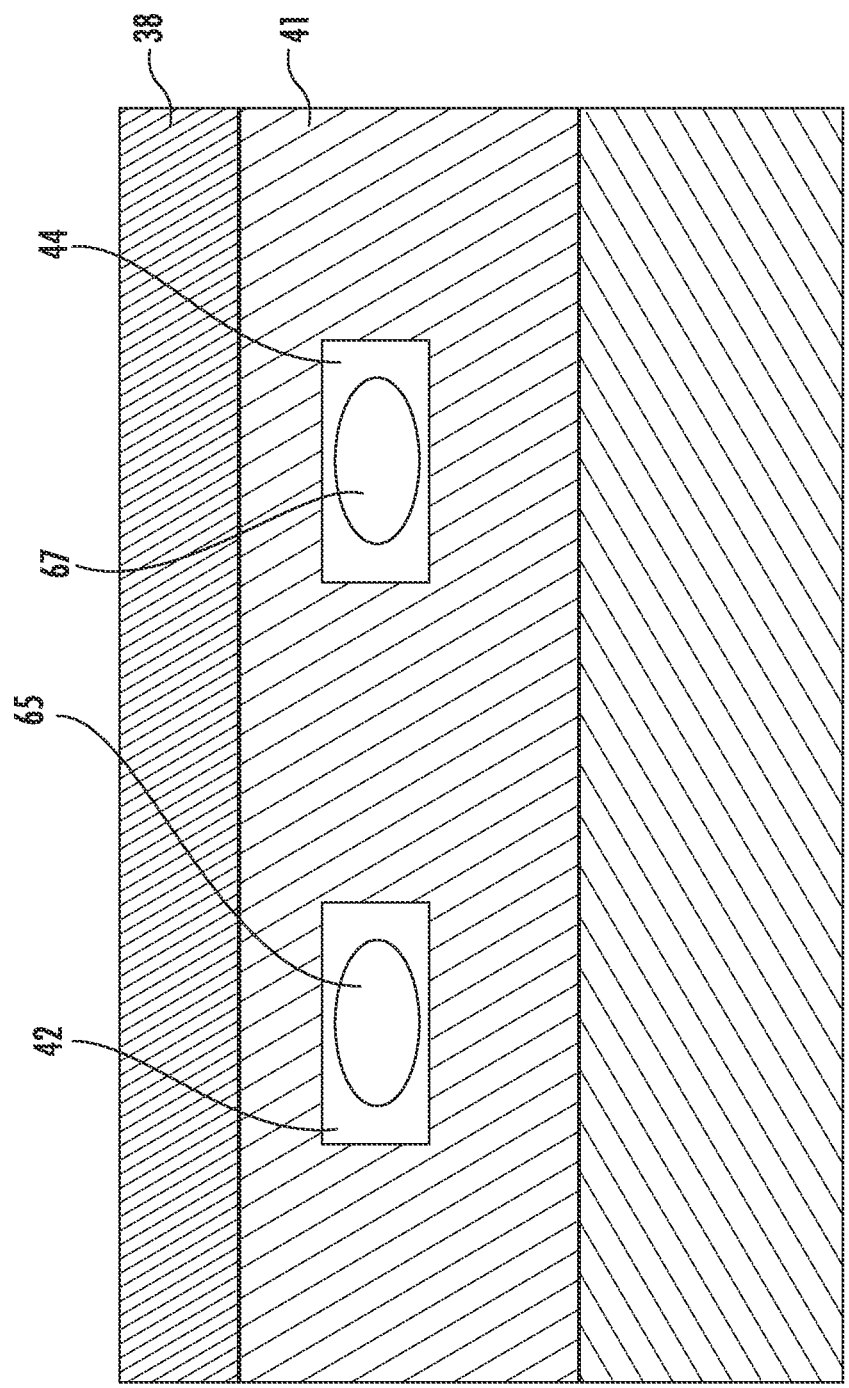
FIG. 22 is a cross sectional view as seen from the line ZZ in FIG. 21.
Figure 23:
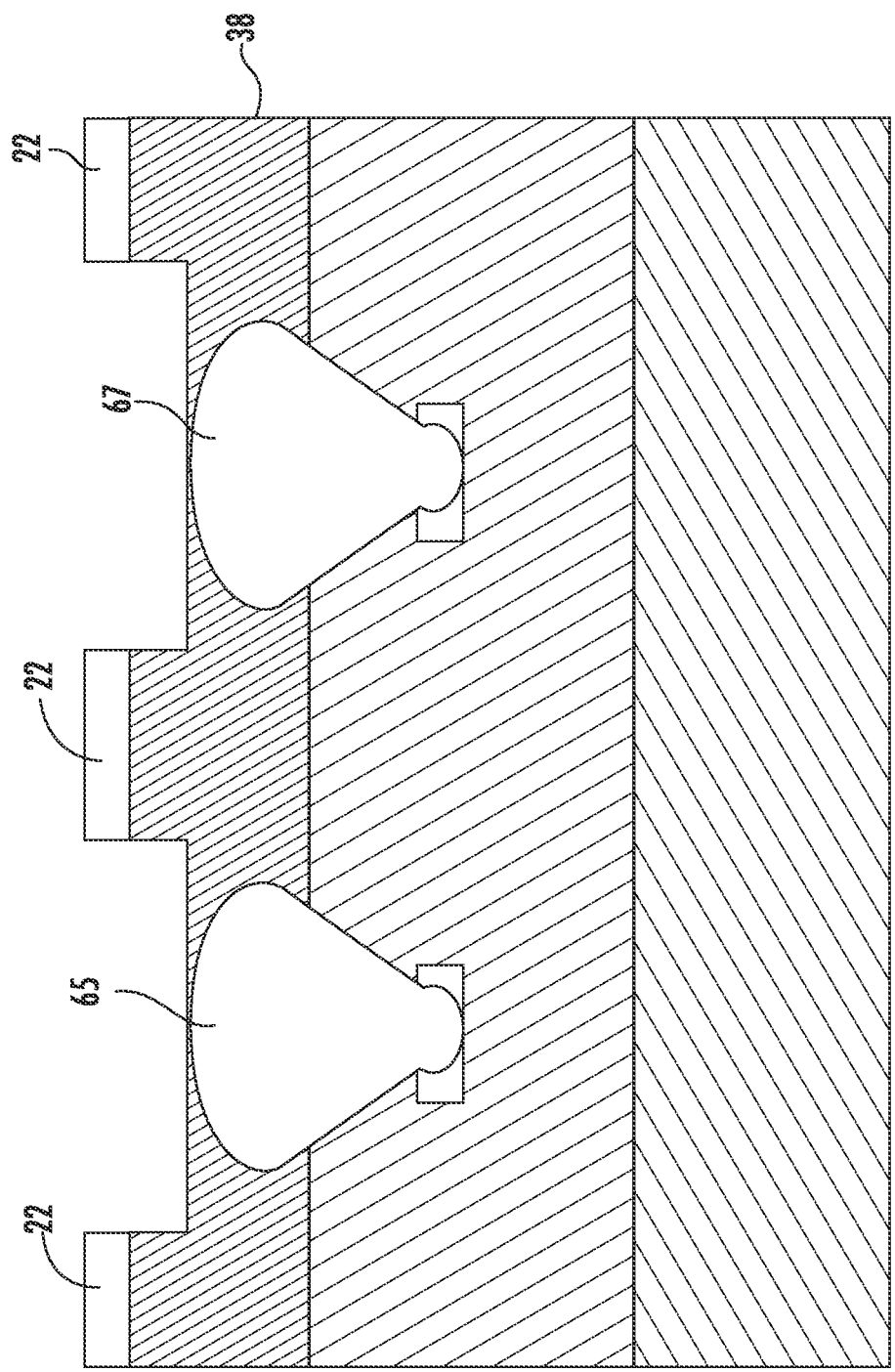
FIG. 23 is a cross sectional view as seen from the line AA in FIG. 21 in one example of a low loss narrowed waveguide.
Figure 24:
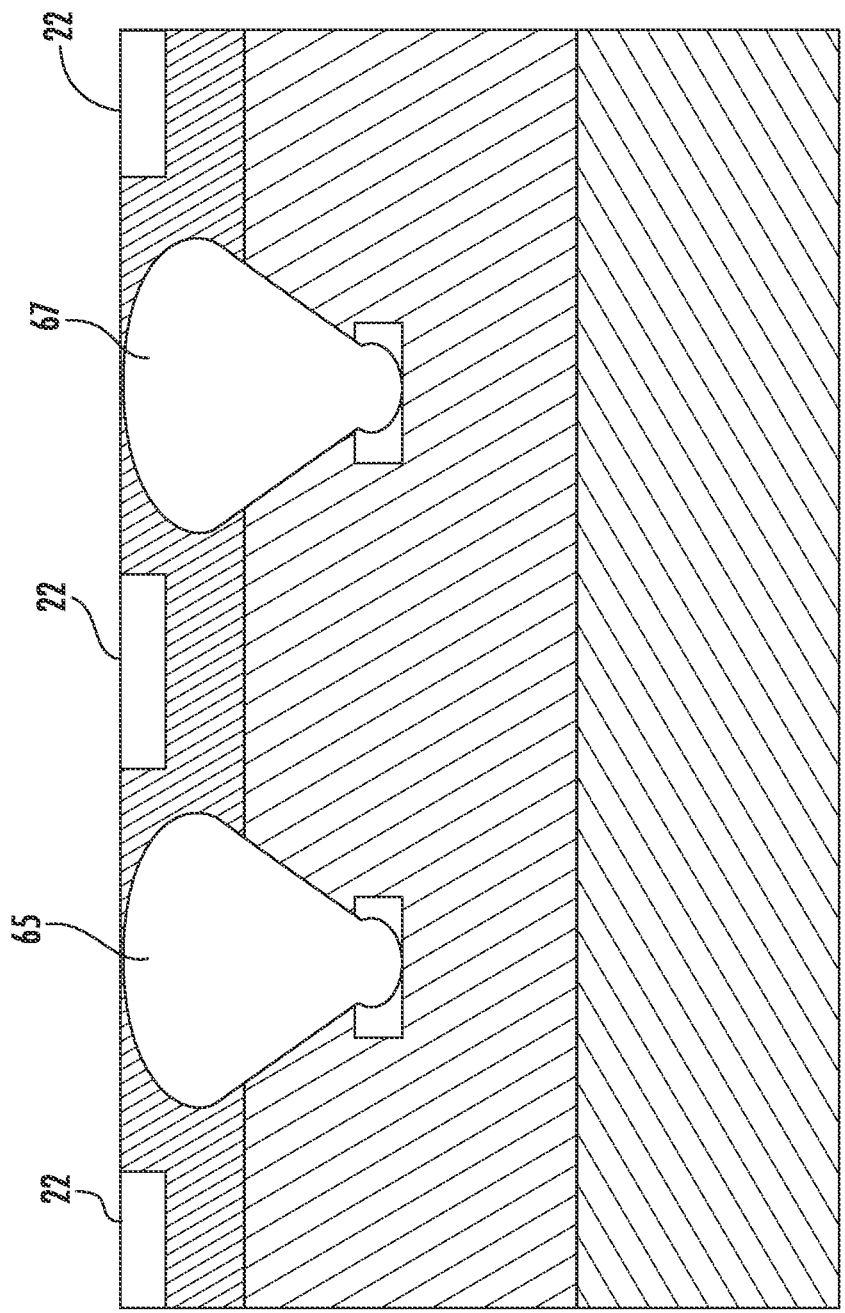
FIG. 24 is a cross sectional view, similar to FIG. 23, as seen from the line AA in FIG. 21 in another example of a low loss narrowed waveguide.

Referring additionally to FIG. 22, a cross-sectional view as seen from the line ZZ in FIG. 21 is illustrated. In this view the light is represented by an oval shaped spot 65 in waveguide 42 and an oval shaped spot 67 in waveguide 44. As light represented by arrows 65 and 66 reaches narrowed 3D portions 46 and 48 of waveguides 42 and 44, respectively, narrowed 3D portions 46 and 48 cause some or all of the light to transition to polymer layer 38. It should be understood that not necessarily all of the light progressing through the waveguide cores transitions into the EO polymer layer at the necked-down area but most of it does. This transition is illustrated in FIG. 23 by a cross-sectional view as seen from the line AA in FIG. 21. It will be noted that FIGS. 23 and 24 illustrate different embodiments for the placement of electrodes 22, the use of which may depend upon the specific application and fabrication process.

Figure 25:
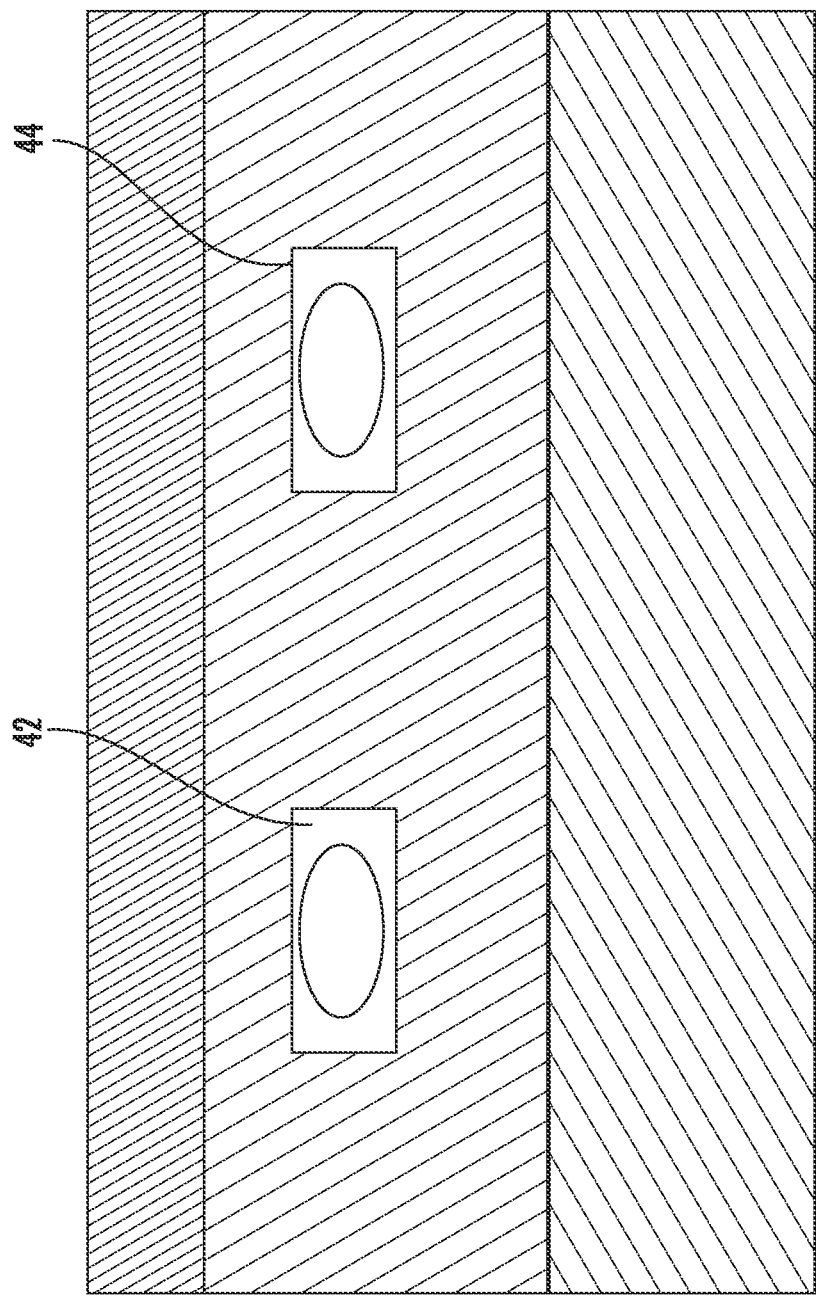
FIG. 25 is a cross sectional view as seen from the line BB in FIG. 21.
Figure 26:
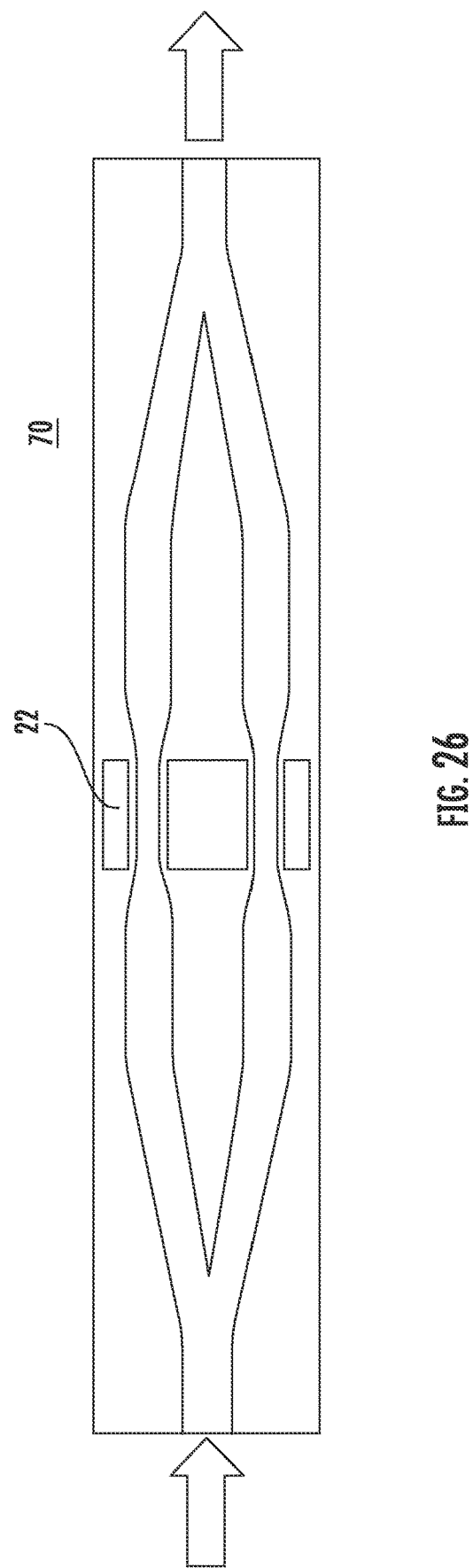
FIG. 26 is a top view of a Mach-Zehnder modulator incorporating a single polymer layer device assembly with a waveguide layout in an integrated photonics platform.

Referring additionally to FIG. 25, a cross-sectional view as seen from the line BB in FIG. 21 is illustrated. In this view the light (some or all of the light entering waveguides 42 and 44) represented by arrows 66 and 68 transitions back into waveguides 42 and 44, respectively, as the narrowed 3D portions 46 and 48 of waveguides 42 and 44 finish or return to normal size. The light progressing through polymer layer 38 can be modulated in a well-known manner by applying electrical signals to electrodes 22. The modulation can be, for example, intensity or phase modulation. Modulated light is present at light outputs 61 and 63 where it may be reunited in a well-known fashion and applied to following devices. A top view of a Mach-Zehnder modulator device 70 is illustrated in FIG. 26 to show the complete structure, including the relative positions of electrodes 22. It will be understood that other devices can be fabricated using the described techniques and processes and the Mach-Zehnder modulator is simply a preferred device.

Thus, a new and improved thin film polymer optical transition device incorporating a single layer of EO polymer has been disclosed. The new and improved thin film polymer modulator is easier to fabricate and requires less labor and materials. A new and improved method of fabricating a thin film polymer modulator is also disclosed. The new process uses standard fabrication processes so that no additional expertise or equipment is required.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A thin film polymer device comprising:
   a platform;
   at least one waveguide core surrounded by dielectric material positioned on the platform, the waveguide core having a passive input portion and a passive output portion joined by a necked down active portion;
   a layer of EO polymer material positioned on a surface of the dielectric material overlying the necked down active portion of the waveguide core;
   the waveguide core, the EO polymer, and the dielectric material all having refractive indices with the refractive index of the EO polymer being higher than the refractive index of the dielectric material; and
   at least some light progressing through the waveguide core from the passive input portion to the passive output portion transitions to the layer of EO polymer material as it enters the necked down active portion and transitions back to the waveguide core as it leaves the necked down active portion.

2. The thin film polymer device claimed in claim 1 wherein the at least one waveguide core includes a pair of similar waveguide cores spaced apart in a plane and extending parallel to each other.

3. The thin film polymer device claimed in claim 2 wherein the layer of EO polymer material is included in a single polymer layer device assembly, the device assembly includes a silicon base having an oxidized surface, metallization on the oxidized surface defining electrodes for operating the thin film polymer device, a bottom clad layer on the electrodes forming a planar surface, a blocking layer on the planar surface, and the layer of EO polymer material positioned on the blocking layer.

4. The thin film polymer device claimed in claim 3 wherein the single polymer layer device assembly is positioned on the dielectric material surrounding the at least one waveguide core with a surface of the layer of EO polymer material in abutting engagement with the dielectric material surrounding the at least one waveguide core.

5. The thin film polymer device claimed in claim 3 including a layer of transparent glue affixing a surface of the dielectric material surrounding the at least one waveguide core to a surface of the layer of EO polymer material.

6. The thin film polymer device claimed in claim 1 wherein the width of the necked down active portion of the waveguide core is gradually reduced from the width of the passive input portion and gradually increased to the width of the passive output portion.

7. The thin film polymer device claimed in claim 1 wherein the at least one waveguide core includes a pair of similar waveguide cores spaced apart in a plane and extending parallel to each other and electrodes positioned adjacent the layer of EO polymer material, the pair of similar waveguide cores, the layer of EO polymer material, and the electrodes being positioned to form a Mach-Zehnder modulator.

8. The thin film polymer device claimed in claim 1 wherein the passive input portion and the passive output portion of the at least one waveguide core has a horizontal width in a range of 0.1 μm to 10 μm and the necked down active portion has a horizontal width in a range of 2:1 to 5:1, where the ratio is the passive portion width to the active portion width.

9. The thin film polymer device claimed in claim 1 wherein the passive input portion and the passive output portion of the at least one waveguide core each have a horizontal width in a range of 0.5 μm to 8 μm and the necked down active portion has a horizontal width reduced by greater than 0.4 μm.

10. A thin film polymer device comprising:
    a silicon substrate defining a platform;
    a pair of similar waveguide cores spaced apart in a plane and extending parallel to each other, the pair of waveguide cores surrounded by dielectric material positioned on the platform, each of pair of waveguide cores having a passive input portion and a passive output portion joined by a necked down active portion;
    a layer of EO polymer material positioned on a surface of the dielectric material overlying the necked down active portion of the waveguide core;
    electrodes positioned adjacent to the layer of EO polymer material and in a spaced relationship to the pair of waveguide cores;
    the waveguide core, the EO polymer, and the dielectric material all having refractive indices with the refractive index of the EO polymer being higher than the refractive index of the dielectric material; and
    the pair of similar waveguide cores, the layer of EO polymer material, and the electrodes being positioned to form a Mach-Zehnder modulator in which at least some light progressing through the waveguide core from the passive input portion to the passive output portion transitions to the layer of EO polymer material as it enters the necked down active portion and transitions back to the waveguide core as it leaves the necked down active portion.

11. The thin film polymer device claimed in claim 10 wherein the passive input portion and the passive output portion of the at least one waveguide core has a horizontal width in a range of 0.1 μm to 10 μm and the necked down active portion has a horizontal width in a range of 2:1 to 5:1, where the ratio is the passive portion width to the active portion width.

12. The thin film polymer device claimed in claim 10 wherein the passive input portion and the passive output portion of the at least one waveguide core each have a horizontal width in a range of 0.5 μm to 8 μm and the necked down active portion has a horizontal width reduced by greater than 0.4 μm.

13. A method of fabricating a thin film polymer device comprising the steps of;
    fabricating a single polymer layer device assembly including the steps of:
       providing a silicon base having an oxidized surface;
       depositing a metallization layer on the oxidized surface and patterning the metallization layer to define electrodes for operating the thin film polymer device;
       depositing a bottom clad layer on the electrodes forming a planar surface;

depositing a blocking layer on the planar surface of the bottom clad layer; and depositing a layer of EO polymer material on the blocking layer;

fabricating a waveguide layout including a pair of similar waveguide cores spaced apart in a plane and extending parallel to each other, the pair of waveguide cores surrounded by dielectric material positioned on a platform, each of the pair of waveguide cores having a passive input portion and a passive output portion joined by a necked down active portion; and affixing a surface of the EO polymer material to a surface of the dielectric material on the platform with the electrodes positioned relative to the necked down active portions of the pair of similar waveguide cores to form a Mach-Zehnder modulator.

14. The method of fabricating a thin film polymer device as claimed in claim 13 including a step of poling the layer of EO polymer material.

15. The method of fabricating a thin film polymer device as claimed in claim 13 wherein step of affixing includes one of bonding using a flip-chip bonding method or including a transparent layer of glue between the surface of the EO polymer material and the surface of the dielectric material on the platform.

16. The method of fabricating a thin film polymer device as claimed in claim 13 wherein the step of fabricating a waveguide layout including a pair of similar waveguide cores includes forming the waveguide core with a horizontal width in a range of 0.1 μm to 10 μm and the necked down active portion with a horizontal width in a range of 2:1 to 5:1, where the ratio is the passive portion width to the active portion width.

17. The method of fabricating a thin film polymer device as claimed in claim 13 wherein the step of fabricating a waveguide layout including a pair of similar waveguide cores includes forming the waveguide cores with a horizontal width in a range of 4 μm to 8 μm and the necked down active portion with a horizontal width reduced by greater than 1 μm.

* * * * *